United States Patent
Mitchell et al.

(10) Patent No.: US 6,675,185 B1
(45) Date of Patent: Jan. 6, 2004

(54) HYBRID DOMAIN PROCESSING OF MULTI-DIMENSIONAL TRANSFORMED DATA

(75) Inventors: Joan L. Mitchell, Longmont, CO (US); Marco Martens, Chappaqua, NY (US); Timothy J. Trenary, Berthoud, CO (US)

(73) Assignee: International Business Machines Corporation, Armonk, NY (US)

( * ) Notice: Subject to any disclaimer, the term of this patent is extended or adjusted under 35 U.S.C. 154(b) by 575 days.

(21) Appl. No.: 09/588,477

(22) Filed: Jun. 7, 2000

(51) Int. Cl.[7] .............................................. G06F 17/14
(52) U.S. Cl. ...................................... 708/400; 708/401
(58) Field of Search ............................... 708/400–409; 382/233, 248, 250, 277, 284

(56) References Cited

U.S. PATENT DOCUMENTS

| | | | | |
|---|---|---|---|---|
| 3,925,648 A | * | 12/1975 | Speiser et al. ................... | 708/5 |
| 5,126,962 A | * | 6/1992 | Chiang ......................... | 708/401 |
| 5,257,213 A | * | 10/1993 | Kim et al. ...................... | 708/401 |
| 5,387,982 A | * | 2/1995 | Kitaura et al. ................. | 382/248 |
| 5,475,432 A | * | 12/1995 | Park ........................... | 348/409.1 |
| 5,748,514 A | * | 5/1998 | Okada et al. ................... | 708/402 |
| 5,917,954 A | * | 6/1999 | Girod et al. ................... | 382/248 |
| 6,167,092 A | * | 12/2000 | Lengwehasatit ............... | 375/240.2 |
| 6,215,422 B1 | * | 4/2001 | Henry et al. ................... | 341/51 |
| 6,237,012 B1 | * | 5/2001 | Ohgose ........................ | 708/401 |
| 6,327,602 B1 | * | 12/2001 | Kim ........................... | 708/401 |

OTHER PUBLICATIONS

Chun-tat, Efficient Encoding of DC Coefficients in Transform Coding of Images Using JPEG Scheme, Jun. 1991, IEEE, pp. 404–407.*

* cited by examiner

Primary Examiner—Todd Ingberg
Assistant Examiner—Chat C. Do
(74) Attorney, Agent, or Firm—Whitham, Curtis & Christofferson, P.C.; Stephen C. Kaufman

(57) ABSTRACT

A one-dimensional (1D) Inverse Discrete Cosine Transform (IDCT) is applied to an input two-dimensional (2D) transform block along the axis to be modified. Since the one-dimensional IDCT is not performed on the other axis, each block is left in a one-dimensional transform space (called hybrid space). For a shift (merge), the appropriate "m" elements are picked up from one block and the "8–m" elements are picked up from the other block and are used as input to the one-dimensional forward DCT (FDCT) along that same axis. For two-dimensional shifts or merges, the results of the first one-dimensional IDCT and FDCT can be stored with extra precision to be used as input to a second one-dimensional IDCT and FDCT along the other axis. The execution time worst case conditions are approximately constant for all shift/merger amounts. Taking advantage of fast paths can improve the execution times for typical blocks.

16 Claims, 19 Drawing Sheets

REQUANTIZE AND
LEAVE RESULTS WITH
EXTRA PRECISION
(NON-INTEGER RESULTS)

FIG. 18A

REQUANTIZE AND
ROUND (INTEGER RESULTS)

FIG. 18B

REQUANTIZE AND
LEAVE RESULTS WITH
EXTRA PRECISION.
SET SMALL* COEFFICIENTS
TO ZERO.

FIG. 18C

HYBRID DOMAIN PROCESSING OF MULTI-DIMENSIONAL TRANSFORMED DATA

CROSS REFERENCE TO RELATED APPLICATION

The present application is related to U.S. patent application Ser. No. 09/524,389 filed Mar. 13, 2000, by Timothy J. Trenary, Joan L. Mitchell, Charles A. Micchelli, and Marco Martens for "Shift And/or Merge of Transformed Data along Two Axes", assigned to a common assignee with this application and the disclosure of which is incorporated herein by reference.

DESCRIPTION

BACKGROUND OF THE INVENTION

1. Field of the Invention

The present invention generally relates to transform coding of digital data, specifically to processing of transformed data and, more particularly, to a shift and/or merge of two-dimensional transformed data using hybrid domain processing which increases the speed of, for example, processing of color images printed by color printers. The invention implements an efficient method for two-dimensional merging and shifting of JPEG (Joint Photographic Experts Group) images compressed with the Discrete Cosine Transform (DCT) domain. Since each dimension is handled separately, the shift or merge amounts are independent for the two axes. The invention provides fast shifting of the basic 8×8 DCT blocks contained in baseline JPEG compressed images to create JPEG images on a new grid.

Transform coding is the name given to a wide family of techniques for data coding, in which each block of data to be coded is transformed by some mathematical function prior to further processing. A block of data may be a part of a data object being coded, or may be the entire object. The data generally represent some phenomenon, which may be for example a spectral or spectrum analysis, an image, a video clip, etc. The transform function is usually chosen to reflect some quality of the phenomenon being coded; for example, in coding of still images and motion pictures, the Fourier transform or Discrete Cosine Transform (DCT) can be used to analyze the data into frequency terms or coefficients. Given the phenomenon being compressed, there is generally a concentration of the information into a few frequency coefficients. Therefore, the transformed data can often be more economically encoded or compressed than the original data. This means that transform coding can be used to compress certain types of data to minimize storage space or transmission time over a communication link.

An example of transform coding in use is found in the Joint Photographic Experts Group (JPEG) international standard for still image compression, as defined by ITU-T Rec. T.81 (1992)\ISO/IEC 10918-1:1994, Information technology—Digital compression and coding of continuous-tone still images, Part 1: Requirements and Guidelines. Another example is the Moving Pictures Experts Group (MPEG) international standard for motion picture compression, defined by ISO/IEC 11172:1993, Information Technology—Coding of moving pictures and associated audio for digital storage media at up to about 1.5 Mbits/s. This MPEG-1 standard defines a video compression (Part 2 of the standard). A more recent MPEG video standard (MPEG-2) is defined by ITU-T Rec. H.262\ISO/IEC 13818-2: 1996 Information Technology—Generic Coding of moving pictures and associated audio—Part 2: video. All three image international data compression standards use the DCT on 8×8 blocks of samples to achieve image compression. DCT compression of images is used herein to give illustrations of the general concepts put forward below; a complete explanation can be found in Chapter 4 "The Discrete Cosine Transform (DCT)" in W. B. Pennebaker and J. L. Mitchell, JPEG: Still Image Data Compression Standard, Van Nostrand Reinhold: New York, (1993).

Wavelet coding is another form of transform coding. Special localized basis functions allow wavelet coding to preserve edges and small details. For compression the transformed data is usually quantized. Wavelet coding is used for fingerprint identification by the Federal Bureau of Investigation (FBI). Wavelet coding is a subset of the more general subband coding technique. Subband coding uses filter banks to decompose the data into particular bands. Compression is achieved by quantizing the lower frequency bands more finely than the higher frequency bands while sampling the lower frequency bands more coarsely than the higher frequency bands. A summary of wavelet, DCT, and other transform coding is given in Chapter 5 "Compression Algorithms for Diffuse Data" in Roy Hoffman, Data Compression in Digital Systems, Chapman and Hall: New York, (1997).

In any technology and for any phenomenon represented by digital data, the data before a transformation is performed are referred to as being "in the real domain". After a transformation is performed, the new data are often called "transform data" or "transform coefficients", and referred to as being "in the transform domain". Since the present invention works on multi-dimensional transformed data after taking the inverse transform on less than the total dimension, we are defining a new term, "hybrid domain", to indicate that the orthogonal axis/axes is still transformed. To simplify notation, we will describe the invention for two dimensional transform data. Unless the context makes another meaning clear, the term "transform domain" will refer to the full multi-dimensional transform domain. The function used to take data from the real domain to the transform domain is called the "forward transform". The mathematical inverse of the forward transform, which takes data from the transform domain to the real domain, is called the respective "inverse transform".

In general, the forward transform will produce real-valued data, not necessarily integers. To achieve data compression, the transform coefficients are converted to integers by the process of quantization. Suppose that ($\lambda_i$) is a set of real-valued transform coefficients resulting from the forward transform of one unit of data. Note that one unit of data may be a one-dimensional or two-dimensional block of data samples or even the entire data. The "quantization values" ($q_i$) are parameters to the encoding process. The "quantized transform coefficients" or "transform-coded data" are the sequence of values ($a_i$) defined by the quantization function Q:

$$a_i = Q(\lambda_i) = \left\lfloor \frac{\lambda_i}{q_i} + 0.5 \right\rfloor, \quad (1)$$

where $\lfloor x \rfloor$ means the greatest integer less than or equal to x.

The resulting integers are then passed on for possible further encoding or compression before being stored or transmitted. To decode the data, the quantized coefficients are multiplied by the quantization values to give new "dequantized coefficients" ($\lambda_i'$) given by $$\lambda_i' = q_i a_i \quad (2)$$

The process of quantization followed by de-quantization (also called inverse quantization) can thus be described as "rounding to the nearest multiple of $q_i$". The quantization values are chosen so that the loss of information in the quantization step is within some specified bound. For example, for image data, one quantization level is usually the smallest change in data that can be perceived. It is quantization that allows transform coding to achieve good data compression ratios. A good choice of transform allows quantization values to be chosen which will significantly cut down the amount of data to be encoded. For example, the DCT is chosen for image compression because the frequency components which result produce almost independent responses from the human visual system. This means that the coefficients relating to those components to which the visual system is less sensitive, namely the high-frequency components, may be quantized using large quantization values without loss of image quality. Coefficients relating to components to which the visual system is more sensitive, namely the low-frequency components, are quantized using smaller quantization values.

The inverse transform also generally produces non-integer data. Usually the decoded data are required to be in integer form. For example, systems for the display of image data generally accept input in the form of integers. For this reason, a transform decoder generally includes a step that converts the non-integer data from the inverse transform to integer data, either by truncation or by rounding to the nearest integer. There is also often a limit on the range of the integer data output from the decoding process in order that the data may be stored in a given number of bits. For this reason the decoder also often includes a "clipping" stage that ensures that the output data are in an acceptable range. If the acceptable range is [a, b], then all values less than a are changed to a, and all values greater than b are changed to b.

These rounding and clipping processes are often considered an integral part of the decoder, and it is these which are the cause of inaccuracies in decoded data and in particular when decoded data are re-encoded. For example, the JPEG standard (Part 1) specifies that a source image sample is defined as an integer with precision P bits, with any value in the range 0 to $2^{P-1}$. The decoder is expected to reconstruct the output from the inverse discrete cosine transform (IDCT) to the specified precision. For the baseline JPEG coding P is defined to be 8; for other JPEG DCT-based coding P can be 8 or 12. The MPEG-2 video standard states in Annex A (Discrete Cosine Transform), "The input to the forward transform and the output from the inverse transform is represented with 9 bits."

For the JPEG standard, the compliance test data for the encoder source image test data and the decoder reference test data are 8 bit/sample integers. Even though rounding to integers is typical, some programming languages convert from floating point to integers by truncation. Implementations in software that accept this conversion to integers by truncation introduce larger errors into the real-domain integer output from the inverse transform.

The term "high-precision" is used herein to refer to numerical values which are stored to a precision more accurate than the precision used when storing the values as integers. Examples of high-precision numbers are floating-point or fixed-point representations of numbers.

In performing a printing operation, there is a need for the printer to be able to merge a portion of an 8×8 Discrete Cosine Transform (DCT) domain block with the complementary portion of a second DCT block quickly. The traditional approach involves conversion from the DCT domain for each of the original blocks to the respective real domains (each a 64-bit sample space) via an inverse DCT followed by merging the components of interest from each block in the real domain and finally transforming this new image back to the DCT domain. This method involves more computations than is necessary and lengthens total processing time.

While it is commonplace for graphics utilities to merge two independent images with brute force pixel-by-pixel merges as described above, it is also possible to approach the problem by working exclusively in the frequency domain. This approach potentially has at least two advantages over the traditional method in that it (1) provides for faster and more flexible image processing than the traditional technology and (2) eliminates errors which routinely take place when working in the real domain with fixed precision computation by avoiding the real domain entirely. The invention described in copending application Ser. No. 09/524,389 works exclusively in the transform domain.

The present invention relates to processing in an intermediate domain, called the "hybrid" domain, a domain between the transform domain and the real domain. This type of processing is called hybrid domain processing.

2. Background Description

The purpose of image compression is to represent images with less data in order to save storage costs or transmission time and costs. The most effective compression is achieved by approximating the original image, rather than reproducing it exactly. The JPEG standard allows the interchange of images between diverse applications and opens up the capability to provide digital continuous-tone color images in multi-media applications. JPEG is primarily concerned with images that have two spatial dimensions, contain grayscale or color information, and possess no temporal dependence, as distinguished from the MPEG (Moving Pictures Experts Group) standard. The amount of data in a digital image can be extremely large, sometimes being millions of bytes. JPEG compression can reduce the storage requirements by more than an order of magnitude and improve system response time in the process.

One of the basic building blocks for JPEG is the Discrete Cosine Transform (DCT). An important aspect of this transform is that it produces uncorrelated coefficients. Decorrelation of the coefficients is very important for compression because each coefficient can be treated independently without loss of compression efficiency. Another important aspect of the DCT is the ability to quantize the DCT coefficients using visually-weighted quantization values. Since the human visual system response is very dependent on spatial frequency, by decomposing an image into a set of waveforms, each with a particular spatial frequency, it is possible to separate the image structure the eye can see from the structure that is imperceptible. The DCT provides a good approximation to this decomposition.

The most straightforward way to implement the DCT is to follow the theoretical equations. When this is done, an upper limit of 64 multiplications and 56 additions is required for each one-dimensional (1-D) 8-point DCT. For a full 8×8 DCT done in separable one-dimensional format—eight rows and then eight columns—would require 1,024 multiplications and 896 additions plus additional operations to quantize the coefficients. In order to improve processing speed, fast DCT algorithms have been developed. The origins of these algorithms go back to the algorithm for the Fast Fourier Transform (FFT) implementation of the Discrete Fourier Transform (DFT). The most efficient algorithm for the 8×8 DCT requires only 54 multiplications, 464 additions and 6 arithmetic shifts.

The two basic components of an image compression system are the encoder and the decoder. The encoder compresses the "source" image (the original digital image) and provides a compressed data (or coded data) output. The compressed data may be either stored or transmitted, but at some point are fed to the decoder. The decoder recreates or "reconstructs" an image from the compressed data. In general, a data compression encoding system can be broken into three basic parts: an encoder model, an encoder statistical model, and an entropy encoder. The encoder model generates a sequence of "descriptors" that is an abstract representation of the image. The statistical model converts these descriptors into symbols and passes them on to the entropy encoder. The entropy encoder, in turn, compresses the symbols to form the compressed data. The encoder may require external tables; that is, tables specified externally when the encoder is invoked. Generally, there are two classes of tables; model tables that are needed in the procedures that generate the descriptors and entropy-coding tables that are needed by the JPEG entropy-coding procedures. JPEG uses two techniques for entropy encoding: Huffman coding and arithmetic coding. Similarly to the encoder, the decoder can be broken into basic parts that have an inverse function relative to the parts of the encoder.

JPEG compressed data contains two classes of segments: entropy-coded segments and marker segments. Other parameters that are needed by many applications are not part of the JPEG compressed data format. Such parameters may be needed as application-specific "wrappers" surrounding the JPEG data; e.g., image aspect ratio, pixel shape, orientation of image, etc. Within the JPEG compressed data, the entropy-coded segments contain the entropy-coded data, whereas the marker segments contain header information, tables, and other information required to interpret and decode the compressed image data. Marker segments always begin with a "marker", a unique 2-byte code that identifies the function of the segment.

There is a need for fast shifting of the basic 8×8 DCT blocks contained in baseline JPEG compressed images to create JPEG images on a new grid. There is also a need to merge two JPEG images into a combined JPEG compressed image. The amount of shift "m" (or the number of sample-rows or sample-columns "m" from the first image's blocks to be merged into a new block) are independent of the horizontal and vertical axes.

Traditionally, graphics utilities operate by first doing the two-dimensional (2-D) inverse transform back to the real domain and then working pixel by pixel. The pixel values have been converted to finite precision (usually 8-bits/component sample). The new two-dimensional blocks are generated by doing the two-dimensional forward transform on the processed image. The two-dimensional inverse and forward transform contain too many operations to be fast enough for high speed printing operations. Fast paths exist for the inverse DCT (IDCT) which, due to quantization, has many coefficients of zero. These special cases are estimated to improve throughput by about a factor of three. However, the forward DCT (FDCT) does not have similar fast paths because no pixel values are likely to be zero.

SUMMARY OF THE INVENTION

According to the invention, the solution provided does a one-dimensional (1D) inverse DCT (IDCT) to the input two-dimensional (2D) transform blocks along the axis to be modified. Since the one-dimensional IDCT is not performed on the other axis, each block is neither real data nor transform data. It is called hybrid data. For a shift (merge), the appropriate "m" elements are picked up from one block and the "8−m" elements are picked up from the other block (in a different image for the merge) and are used as input to the one-dimensional forward DCT (FDCT) along that same axis. The re-quantization step can be merged into the final one-dimensional FDCTs. For two-dimensional shifts or merges, the results of the first one-dimensional IDCT and FDCT can be stored with extra precision to be used as input to a second one-dimensional IDCT and FDCT along the other axis. Note that the only difference between the shift and merge (assuming correct alignment of the participating blocks) is the location of the second block. In the shift case, it is the adjacent block in the image along the desired axis. In the merge case, it is from another image.

There are several advantages of handling operations on two-dimensional transform blocks such as the two-dimensional shift and/or merge by doing the one-dimensional IDCT, the operation along that axis, and the one-dimensional FDCT and then repeating for the other axis. These include the following:

1. The computations for the one-dimensional IDCT have known fast paths. For columns (or rows) along the direction of block change that contain only zero elements in both blocks (usually at least half the columns or rows), the one-dimensional IDCT calculation, shift/merge, and then the one-dimensional FDCT calculation can be skipped because the result has only zeros for elements. After a full two-dimensional IDCT, few elements are zero.
2. This invention takes advantage of the fast one-dimensional IDCT and FDCT code which may already be implemented and optimized for the product.
3. This invention eliminates the need for special, separate cases for the different "m" shift or merge amounts.
4. The generic shift of the two-dimensional DCT block by (m,n) should execute faster than any other known method. The merge operation should execute in similar times. The execution times for all combinations of m and n should be about the same.
5. For one-dimensional operations on the two-dimensional transform blocks, the process is much faster than having to perform the full two-dimensional inverse transform to get to the real domain and then the full two-dimensional forward transform to get back the transform two-dimensional blocks.
6. The precision after the one-dimensional IDCTs and the first one-dimensional FDCTs is maintained sufficiently to eliminate concerns about multi-generation problems. The second one-dimensional IDCT along the orthogonal axis does not need to include dequantization if the first FDCT does not include quantization. The quantization is done after the second IDCTs.

This invention will also work for other orthogonal transforms or even higher dimensionality orthogonal transformations if they are fully separable into one-dimensional transforms along each axis. It works for other processing besides the shift and merge examples as long as the original full inverse transform, processing in the real domain, full forward transform can be mathematically separated into one-dimensional inverse transformations, a less than full inverse transform can be performed, the processing done in the resulting hybrid transform space, and then the corresponding forward transform performed to return to the full multi-dimensional transform.

BRIEF DESCRIPTION OF THE DRAWINGS

The foregoing and other objects, aspects and advantages will be better understood from the following detailed description of a preferred embodiment of the invention with reference to the drawings, in which:

FIGS. 18A, 18B and 18C show alternative processing steps for the requantization steps of FIGS. 17A and 17B.

DETAILED DESCRIPTION OF A PREFERRED EMBODIMENT OF THE INVENTION

Although the preferred embodiment uses JPEG compressed data, it will be understood by those skilled in the art that the principles of the invention can be applied to MPEG compressed data or any data transformed by multi-dimensional transforms that separate into orthogonal one-dimensional transforms.

Figure 1:
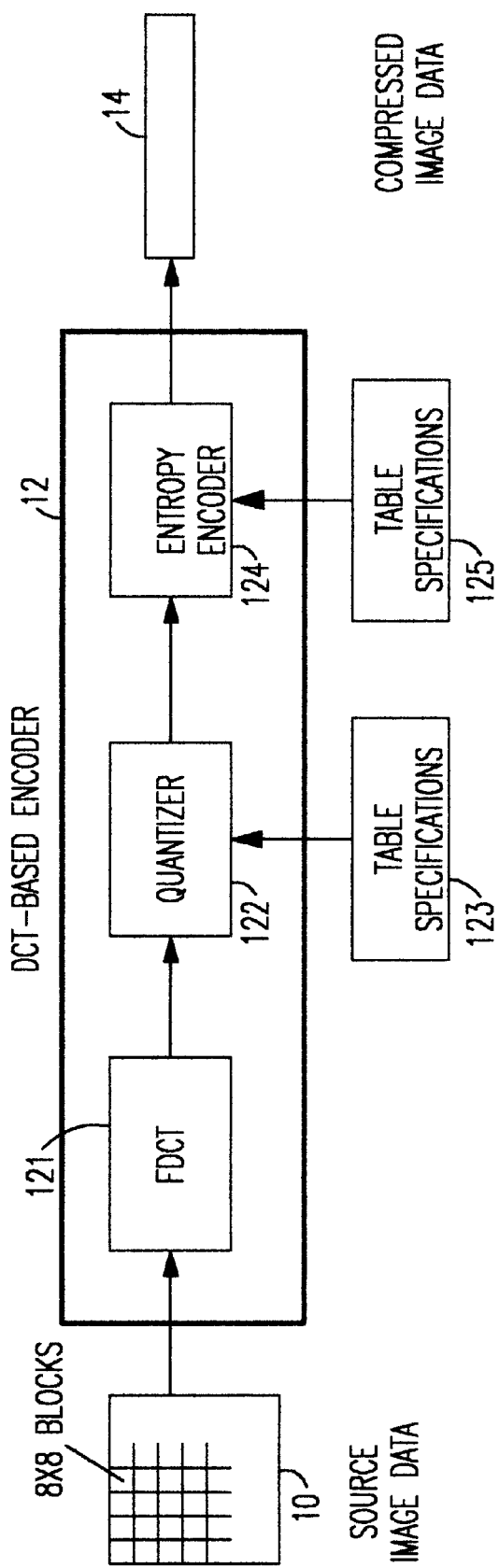
FIG. 1 is a simplified block diagram of a DCT-based JPEG encoder on which the invention may be practiced.

Referring now to the drawings, and more particularly to FIG. 1, there is shown a simplified block diagram of a DCT-based encoder. A source image 10 sampled data in 8×8 blocks are input to the encoder 12. Each 8×8 block is transformed by the FDCT 121 into a set of 64 values, referred to as the DCT coefficients. One of these values is referred to as the DC coefficient, and the other 63 values are referred to as AC coefficients. Each of the 64 coefficients are then quantized by quantizer 122 using one of 64 corresponding values from a quantization table 123. After quantization, the DC coefficient and the 63 AC coefficients are prepared for entropy encoding. The previous quantized DC coefficient is used to predict the current DC coefficient and the difference is encoded. The 63 AC coefficients, however, are not differentially encoded but, rather, are converted into a zig-zag sequence. The quantized coefficients are then passed to an entropy encoding procedure 124 using table specifications 125. This procedure compresses the data further. One of two entropy encoding procedures can be used, Huffman encoding or arithmetic encoding. If Huffman encoding is used, then Huffman table specifications must be provided, but if arithmetic encoding is used, then arithmetic coding conditioning table specifications must be provided. The output of the entropy encoder is the compressed image data 14.

Figure 2:
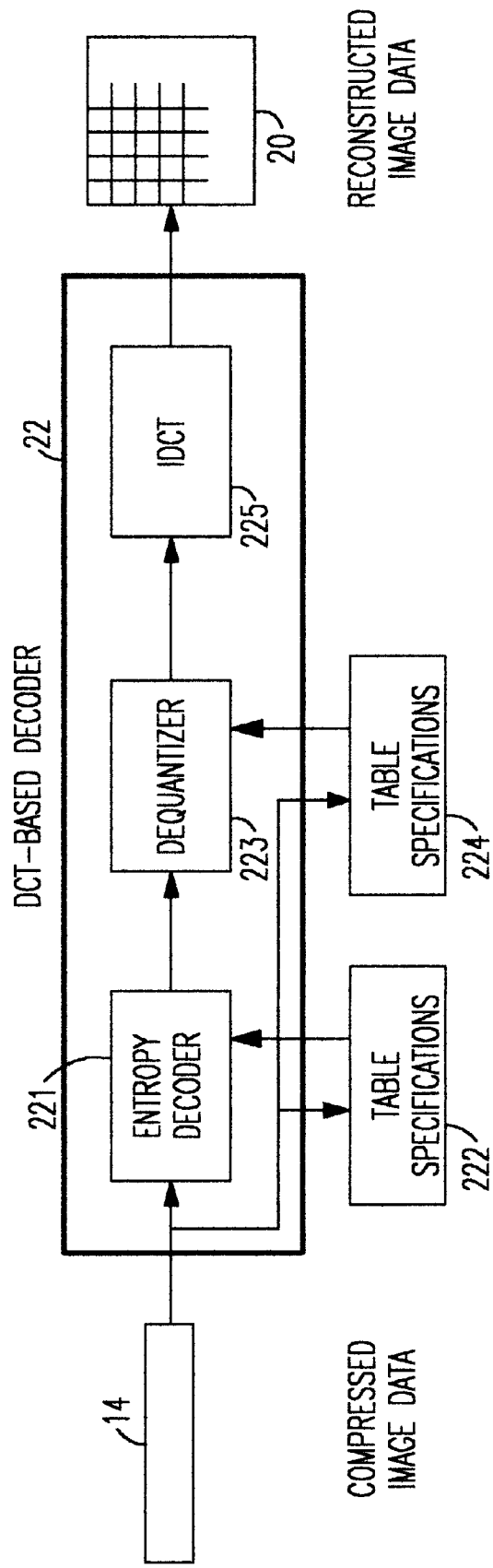
FIG. 2 is a simplified block diagram of a DCT-based JPEG decoder on which the invention may be practiced.

FIG. 2 shows a simplified block diagram of the DCT-based decoder. Each step shown performs essentially the inverse of its corresponding main procedure within the encoder shown in FIG. 1. The compressed image data 14 is input to the decoder 22 where it is first processed by an entropy decoder procedure 221 which decodes the zig-zag sequence of the quantized DCT. This is done using either Huffman table specifications or arithmetic coding conditioning table specifications 222, depending on the coding used in the encoder. The quantized DCT output from the entropy decoder is input to the dequantizer 223 which, using table specifications 224, outputs dequantized DCT coefficients to IDCT 225. The output of the IDCT 225 is the reconstructed image 20.

Figure 3:
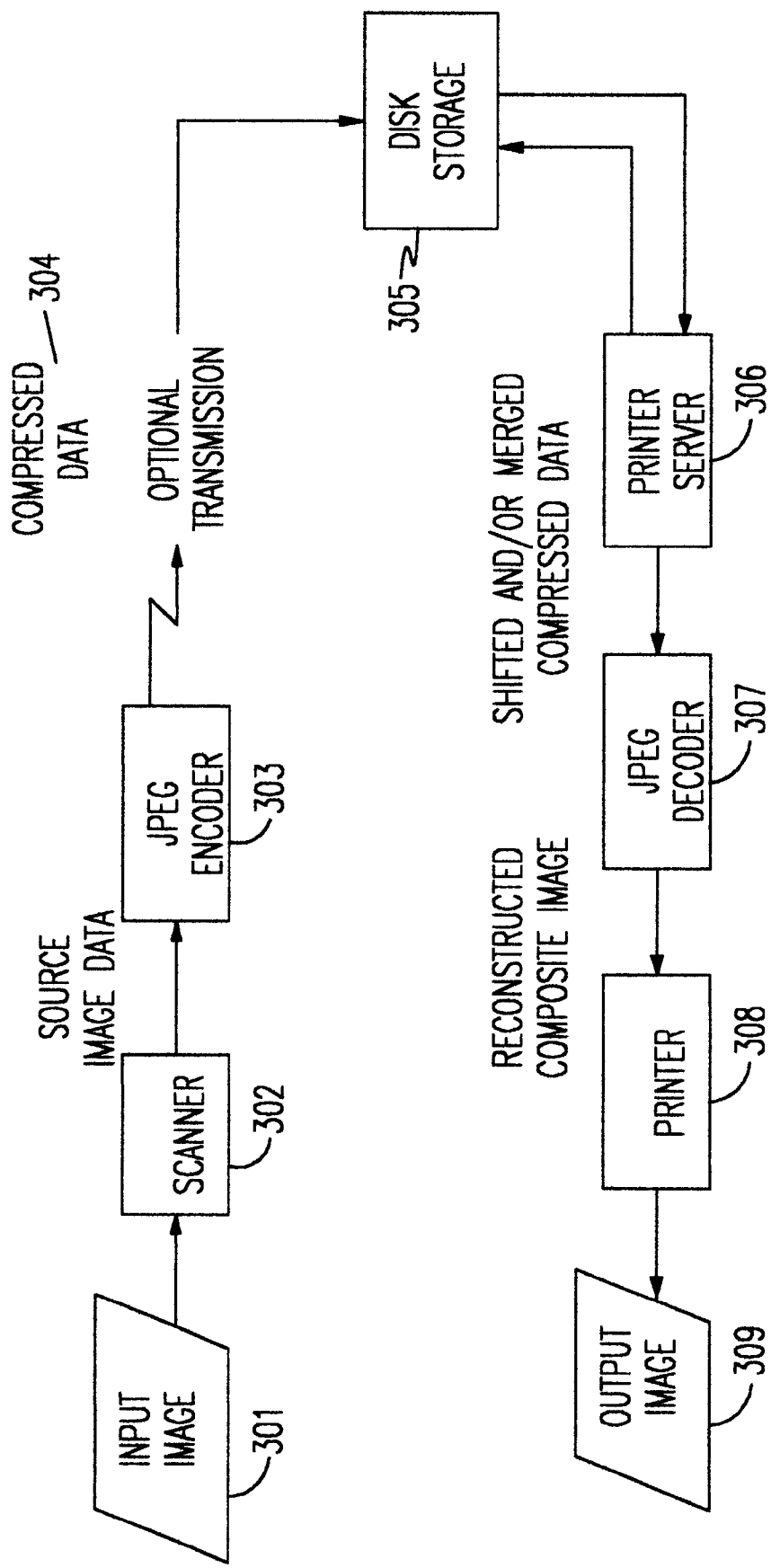
FIG. 3 is a block diagram of a simple printing system that uses JPEG compressed images.

FIG. 3 shows a block diagram of a simple printing system that uses JPEG compressed images. For this illustration, the input image is assumed to be a grayscale image and the printer, a grayscale printer. The input image 301 is scanned in the scanner 302 and then the source image data, a single component of gray, is compressed with a JPEG encoder 303, such as described with reference to FIG. 1. The JPEG encoder 303 is shown separate from the scanner 302, but in a practical embodiment, the JPEG encoder 303 could be incorporated with the scanner 302. The output of the JPEG encoder 303 is compressed data 304. After optional transmission, the compressed data is stored on a disk storage device 305. At some later time, the compressed data stored on the disk storage device 305 is retrieved by the printer server 306 which composes a composite image. The composite image is recompressed in the printer server 306 so that the JPEG decoder 307 decodes the composite image. The JPEG decoder 307 is as described with reference to FIG. 2. The printer 308 prints the grayscale composite image and produces the output image 309 on paper. The JPEG decoder 307 is shown separately from the printer 308, but in practical embodiments, the JPEG decoder 307 could be incorporated into the printer 308.

Figure 4:
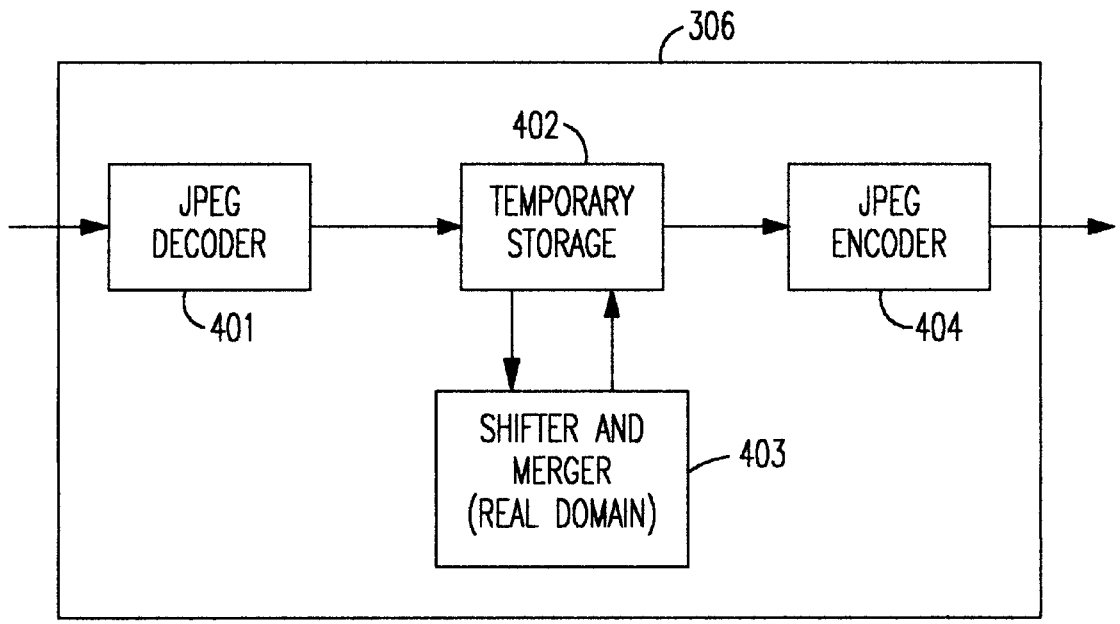
FIG. 4 is a block diagram showing in more detail a conventional printer server of the printing system of FIG. 3.

FIG. 4 shows in more detail a traditional printer server 306. The compressed images are JPEG decoded by JPEG decoder 401 and stored temporarily in temporary storage 402 as 8-bit/sample values. The composite image is created in the real domain by the shifter and merger 403 and stored in temporary storage 402. Then the composite image is encoded with the JPEG encoder 404. The JPEG decoder 401 and the JPEG encoder 404 are, again, like that shown in FIGS. 2 and 1, respectively. All of the blocks including the shifter and merger 403 in the real domain could be programs running in a processor, such as a RISC (Reduced Instruction Set Computer) processor, and example of which is the IBM PowerPC® processor. The point here is that the traditional printer server 306 performs the shift and merge operations in the real domain.

Figure 5:
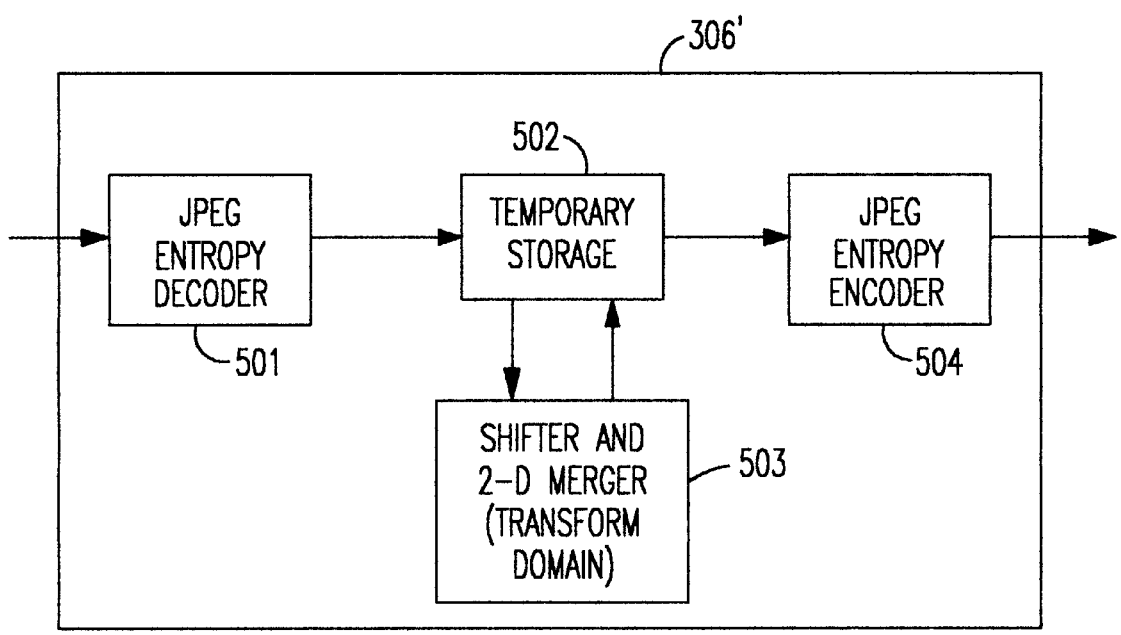
FIG. 5 is a block diagram showing an improved printer server realized by doing the shift and merge in the two-dimensional transform domain.

FIG. 5 shows an improvement over the traditional printer server making a faster printer server 306'. The compressed images are JPEG entropy decoded in JPEG entropy decoder 501, and the quantized DCT coefficients are stored in temporary storage 502. The composite image is created by the two-dimensional shifter and merger 503 using two-dimensional transform domain processing, in contrast to real domain processing. Then the DCT coefficients of the composite image are JPEG entropy encoded in JPEG entropy encoder 504.

Figure 6:
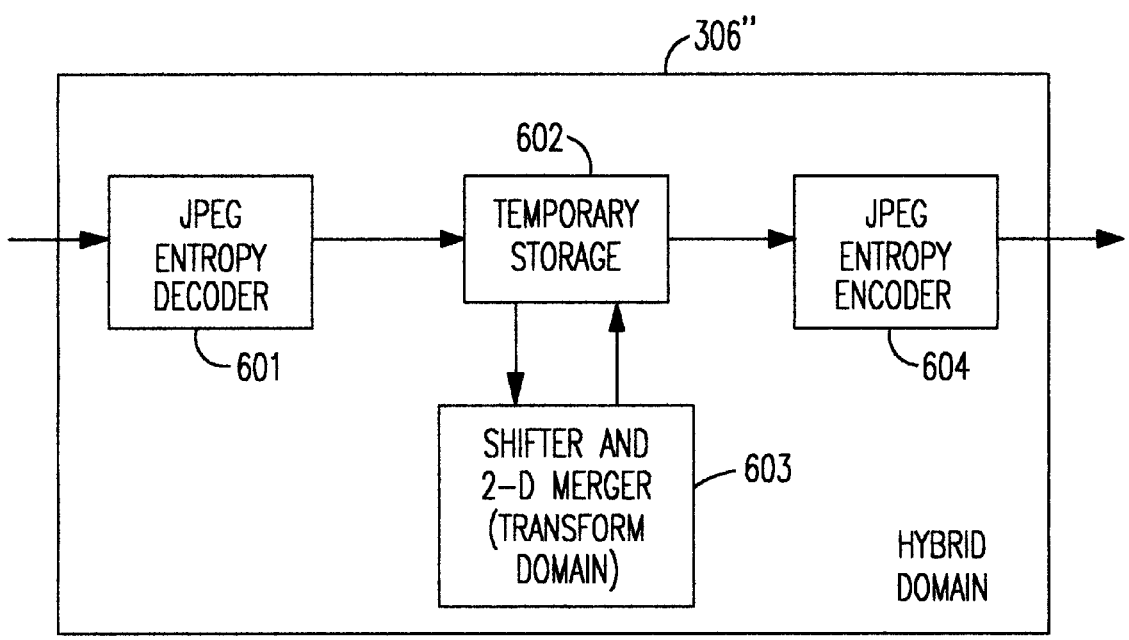
FIG. 6 is a block diagram showing an improved printer server realized by incorporating the principles of the present invention.

FIG. 6 shows the application of the present invention making a faster printer server 306". The compressed images are JPEG entropy decoded in JPEG entropy decoder 601, and the quantized DCT coefficients are stored in temporary storage 602. The composite image is created by the two-dimensional shifter and merger 603 using hybrid domain processing, in contrast to real domain or two-dimensional transform domain processing. Then the DCT coefficients of the composite image are JPEG entropy encoded in JPEG entropy encoder 604. This greatly increases the speed of processing in, for this specific example, high speed printers.

The example of this single gray component can be extended to color by those familiar with color printing. Color images are traditionally printed in Cyan, Magenta, Yellow and blacK (CMYK) toner or ink. High speed printers can have dedicated hardware for each component to decode independent JPEG images. Lower speed printers may take Red, Green and Blue (RGB) images and do the color conversion internally to the printer. In either case, the JPEG blocks are composed of only one component.

Figure 7:
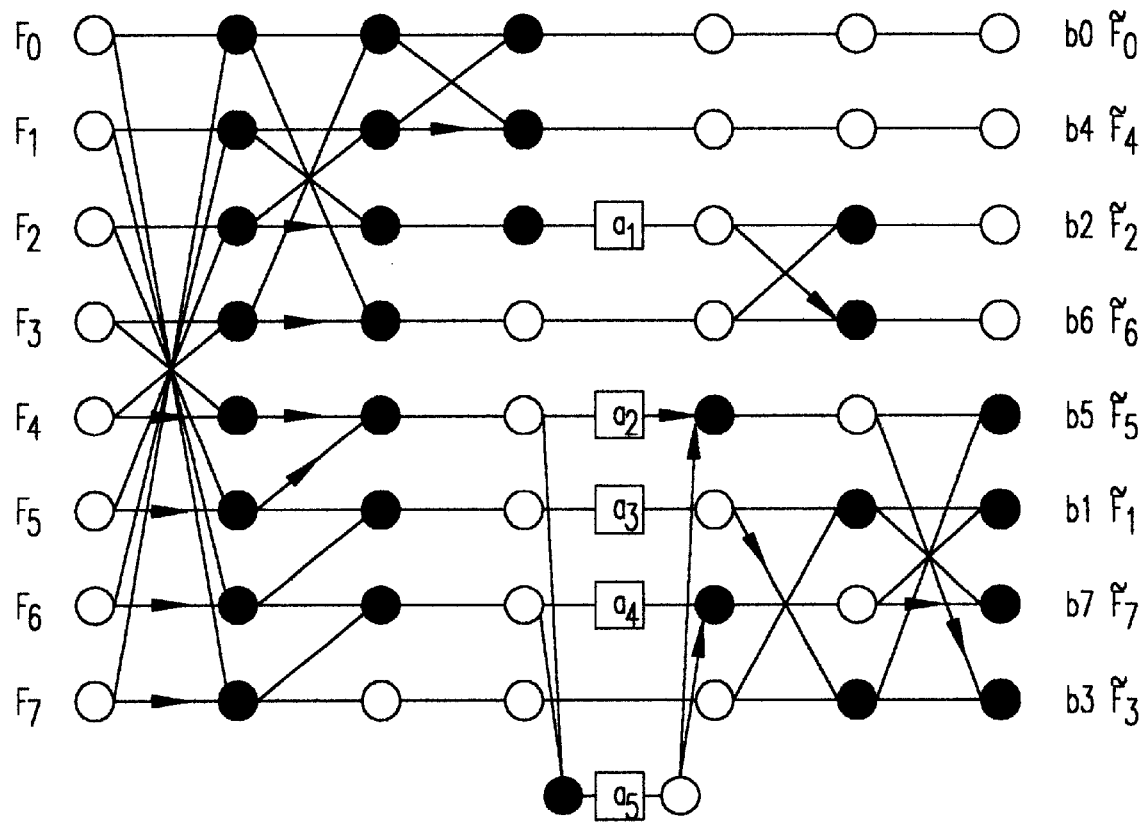
FIG. 7 is a flowgraph showing a prior art one dimensional (1-D) fast Forward Discrete Cosine Transform (FDCT)

FIG. 7 shows the flowgraph for a prior art one dimensional (1-D) fast Forward Discrete Cosine Transform (FDCT). See W. B. Pennebaker and J. L. Mitchell, JPEG Still Image Data Compression Standard, Van Nostrand Reinhold (1993), Chapter 4 "The Discrete Cosine Transform (DCT)", FIGS. 4–8. A fast DCT is a sequence of operations that efficiently computes the set of weighted sums and differences making up the DCT coefficients. The algorithm implemented by the flowgraph of FIG. 7 derives the DCT coefficients by a simple scaling of the real part of the Discrete Fourier Transform (DFT) coefficients. In this flowgraph, the flow is from left to right, and signals are summed where their lines merge at a node (indicated by a solid circle). If a line has an arrow head, then the signal is negated or inverted before the addition to (i.e., subtracted from) the other signal fed to the node. For example, considering the first node in the top line of the flowgraph (signal line $\mathbf{0}$), the input signals are F(0) and F(7) and the output is F(0)+F(7); however, in the first node of the bottom line of the flowgraph (signal line 7), the input signals are again F(0) and F(7), but the output is F(0)−F(7) since F(7) is first negated prior to summing. Multiplication is by a box in the signal line. For the case illustrated in FIG. 7, the multipliers are $a_1$=0.707, $a_2$=0.541, $a_3$=0.707, $a_4$=1.307, and $a_5$=0.383. Counting the solid circles, there are 29 additions required. There are 13 multiplications required, but since eight of the multiplications are to scale the final output to the correct range, there are only 5 multiplications actually required before quantization, making this a very efficient 1-D FDCT.

Figure 8:
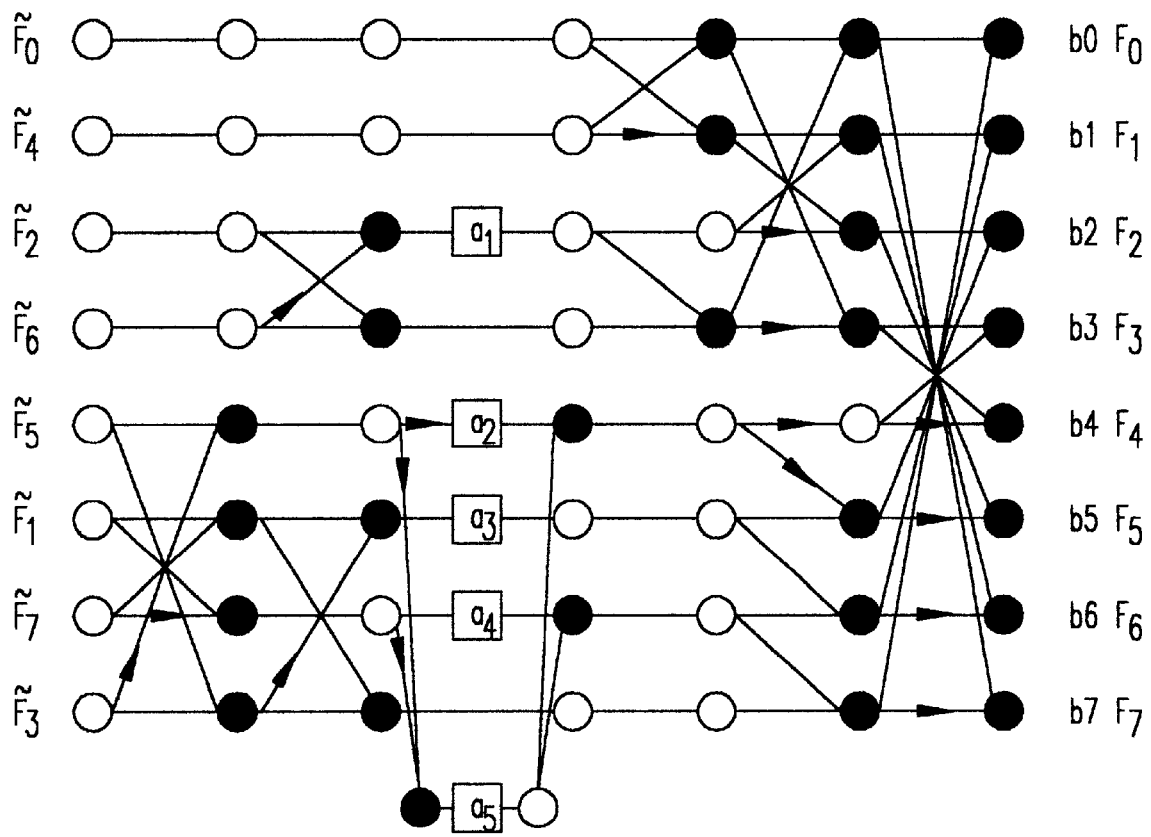
FIG. 8 is a flowgraph showing a prior art 1-D fast Inverse Discrete Cosine Transform (IDCT)

FIG. 8 shows the flowgraph for the 1-D fast Inverse Discrete Cosine Transform (IDCT). It is simply the inverse of the flowgraph of FIG. 7, following the same conventions as described above.

The present invention will be described in the case of two-dimensional transforms which can be separated into one-dimensional orthogonal transforms; in particular, the two-dimensional DCT transform. However, the technique can be generalized to multi-dimensional transforms based on lower dimensional orthogonal transforms, like the two-dimensional DCT transform.

Let D: $\Re^{88} \to \Re^{88}$ be the DCT, given by $$D_{ux} = C_u \cos\left(\frac{\pi}{16}u(2x+1)\right), \quad u, x, = 0, 1, \ldots, 7$$

where $$C_u = \begin{cases} \frac{1}{2\sqrt{2}} & \text{if } u = 0 \\ \frac{1}{2} & \text{otherwise} \end{cases}$$

This matrix is orthogonal and so the inverse of the matrix, $D^{-1}$, is equal to its transpose, $D^T$. The input domain of D is called the sampled or real domain, and the output is said to be in the DCT-domain. The points in the DCT-domain are denoted by capitals with tildes on top; e.g., $\tilde{F}, \tilde{G}, \tilde{H}$. The points in the real domain are denoted by F, G, H.

Merging Operator in Hybrid (One-Dimensional) Domain

Let $$M=(AB)$$

be a one-dimensional merge operator. This merge operator defines a two-dimensional merge operator as follows. Let $G_1, G_2 \in M(8)$ be elements in the real domain, $G_1$ being a block above $G_2$. Now, we can merge the $G_1$ and $G_2$ blocks column-by-column $$F = (A \ B)\begin{pmatrix} G_1 \\ G_2 \end{pmatrix}$$

or $$F=AG_1+BG_2.$$

The transforms are denoted by $\tilde{F}, \tilde{G}_1$, and $\tilde{G}_2$. Then $$\tilde{F}=(D(DF)^T)^T=DFD^{-1}=DAD^{-1}\tilde{G}_1+DBD^{-1}\tilde{G}_2,$$

or in block form notation $$\tilde{F} = D(A \ B)\begin{pmatrix} D^{-1}\tilde{G}_1 \\ D^{-1}\tilde{G}_2 \end{pmatrix}.$$

Observe that $D^{-1}\tilde{G}_1$ and $D^{-1}\tilde{G}_2$ are neither real data blocks nor transform data blocks; it is hybrid data. The above formula describes the algorithm. First apply a fast inverse one-dimensional DCT algorithm to the columns of $\tilde{G}_1$ and $\tilde{G}_2$, then merge (in the hybrid domain), and finally apply a fast forward one-dimensional DCT algorithm to the resultant columns.

The fast forward and inverse one-dimensional DCT algorithms allow incorporation of quantization and de-quantization.

This essentially one-dimensional algorithm can be improved by using Fast-Paths. Namely, the rows and columns of the matrices $\tilde{G}_1$ and $\tilde{G}_2$, which are formed by quantization, will only be non-zero in the first few coefficients of size $\tau=1, 2, 3, \ldots, 8$. There are two possibilities. First, during the process, we determine each time the size of the non-zero $\tau$. Alternatively, we could fix $\tau$ and always perform the calculation based on the size of $\tau$.

Assume the matrices $\tilde{G}_1$ and $\tilde{G}_2$ are non-zero only in the upper left square of size $\tau \times \tau$. We will describe the computation to be done in this case. As an example, take $\tau=3$. This means that the columns 4, 5, 6, 7, and 8 are zero columns. The inverse DCT has nothing to do. The remaining columns 1, 2, and 3 have only the first three entries non-zero. To these firs three we do not have to apply the complete inverse DCT algorithm, but we only have to apply the corresponding Fast Path fast inverse algorithm. We gained by exploring in two different ways the structure of matrices in the DCT domain.

Now, we have to re-group the six columns of hybrid data obtained above. To finish the computation, we have to apply a fast FDCT algorithm to all three resultant columns. The method described above has three main steps.

1) Hybrid domain processing;
2) Fast algorithms for 1-D FDCT and 1-D IDCT; and
3) Fast Path algorithms.

It should be noticed that the steps 1) and 3) are generally applicable whenever we consider two-dimensional transforms of the form $$G \rightarrow (D(DG)^T)^T,$$

where D is an orthogonal matrix, or even multi-dimensional transforms which can be separated into orthogonal one-dimensional transforms. The specific implementations are based on DCT and the fast algorithms for DCT and IDCT are explored.

Figure 9:
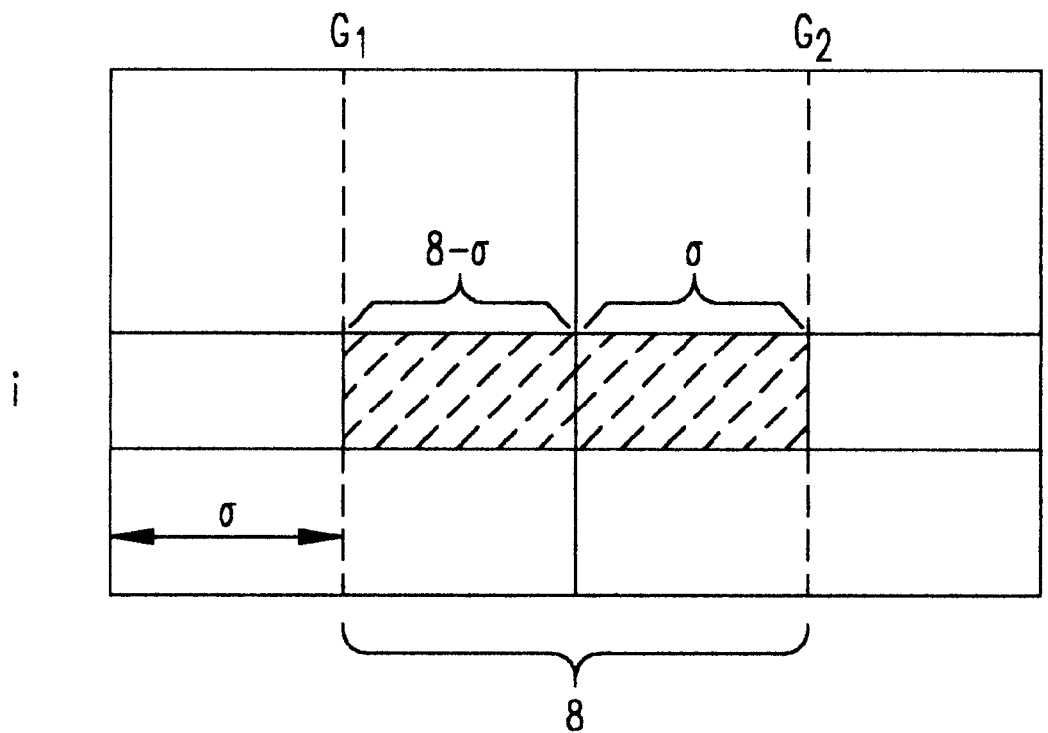
FIG. 9 is a block diagram illustrating the process of a horizontal shift of data in two contiguous blocks of data.
Figure 9:
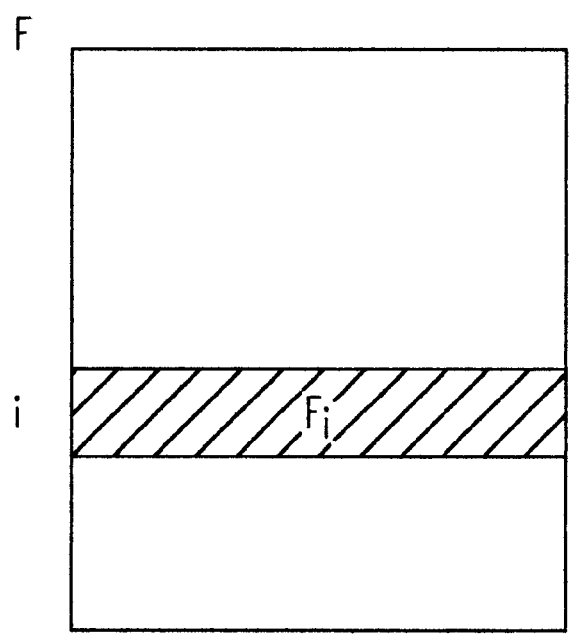

More generally, given a block of n-dimensional orthonormally transformed data representing some original real n-dimensional data, one can perform an m-dimensional ($1 \leq m < n$) inverse transform on this block to produce an n-dimensional "hybrid" block which can then be manipulated to effect a desired m-dimensional change in the n-dimensional real data. At this point, an m-dimensional forward transform is applied to return the manipulated hybrid block back to n-dimensional transform space. By way of illustrative example, FIG. 9 shows two blocks, $G_1$ and $G_2$. In this case, hybrid data corresponding to the $i^{th}$ rows of blocks $G_1$ and $G_2$ are computed. This computation may be done by a one-dimensional forward transform on the columns of $G_1$ and $G_2$ or a one-dimensional inverse transform on the rows of the two-dimensional transformed data, $\tilde{G}_1$ and $\tilde{G}_2$. The resulting hybrid data is merged, 8–$\sigma$ pixels from block $G_1$ and a from block $G_2$, to obtain the hybrid data of a shifted row. Then the transform data corresponding to the hybrid data is computed to produce the row $\tilde{F}_i$ in block $\tilde{F}$ representing shifted data.

Figure 10:
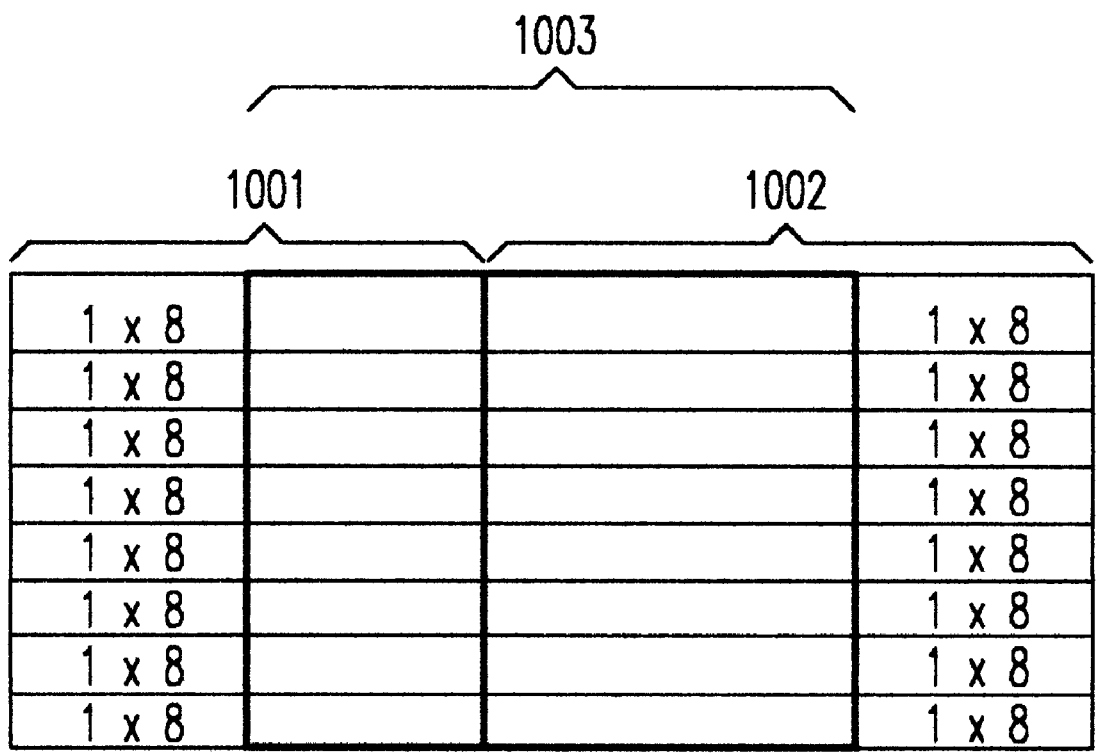
FIG. 10 illustrates how an 8×8 DCT block can be computed from two adjacent two-dimensional 8×8 DCT blocks as eight one-dimensional transform calculations.

FIG. 10 illustrates how an 8×8 block can be computed from two adjacent two-dimensional 8×8 DCT blocks 1001 and 1002 as eight one-dimensional transform calculations. This can be viewed as an extension of one-dimensional case. In FIG. 10, the new block 1003, shown in bold line outline overlapping blocks 1001 and 1002, is composed in this example of $\sigma=3$ right-most samples of the rows of the block 1001 and the 8–$\sigma=5$ left-most samples of the of the block 1002. The one-dimensional equations apply with different quantization values for each row. Therefore, eight sets of shift (or merge) matrices must be calculated.

Figure 11:
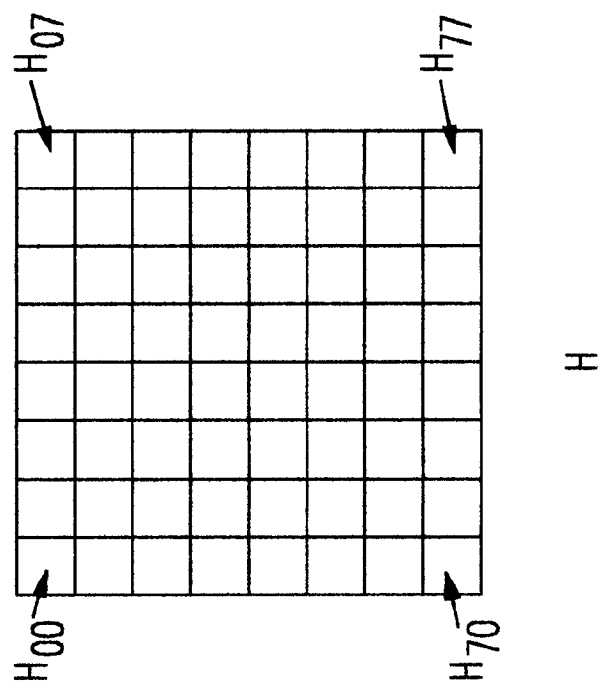
FIG. 11 is a diagram showing two blocks, each having sixty-four samples, for illustrating the extension of the one-dimensional merge algorithm to two dimensions.
Figure 11:
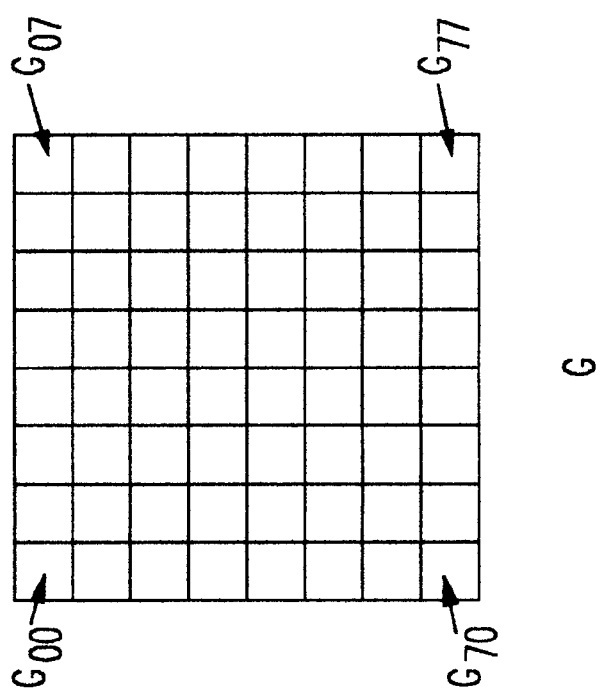
Figure 12:
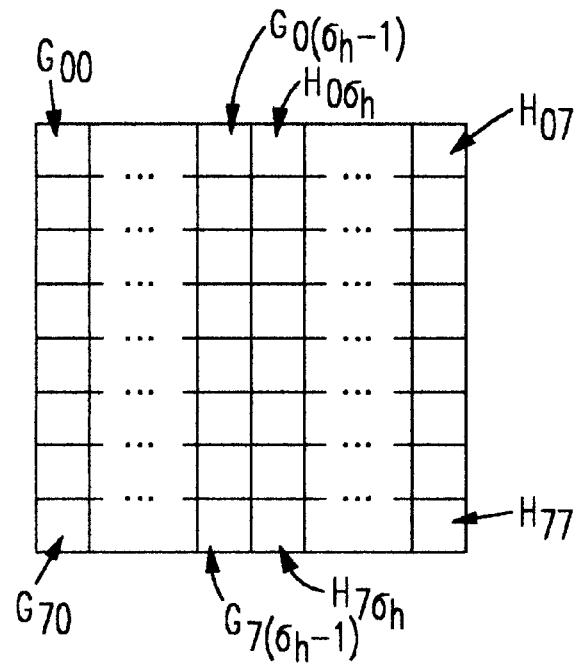
FIG. 12 is a diagram showing a hybrid block generated by merging columns of the two blocks shown in FIG. 11.
Figure 13:
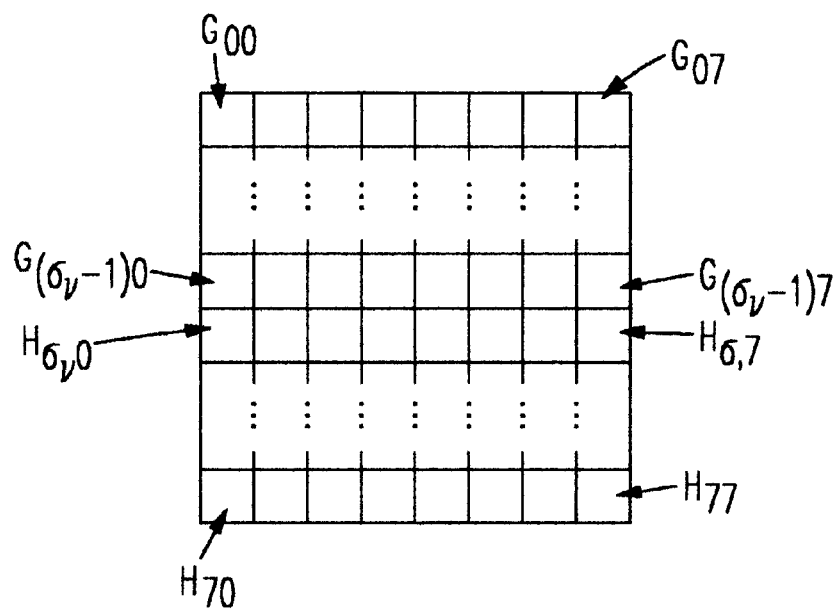
FIG. 13 is a diagram showing a hybrid block generated by merging rows of the two blocks shown in FIG. 11.

It is a simple matter to extend the previous one-dimensional construction to allow for the merging of two 8×8 sample blocks as illustrated in FIG. 11. FIG. 11 shows blocks G and H having 64 samples denoted $G_{00}$ to $G_{77}$ and $H_{00}$ to $H_{77}$, respectively, where the subscript is the row and column index of the sample. Again, it will be understood that the two blocks G and H are on the same grid but are shown separated in FIG. 11 for reasons of clarity. Suppose we desire to form a hybrid block F consisting of the first $\sigma_h$ columns of block G and the last 8–$\sigma_h$ columns of block H, as shown in FIG. 12. This is simply done by applying the one-dimensional merge algorithm for each of the eight rows. To obtain a vertical merge of the two blocks in FIG. 11 of the form shown in FIG. 13, in other words, merging the first $\sigma_v$ rows of block G with the 8–$\sigma_v$ rows of block H, the one-dimensional algorithm is applied to each column.

Figure 14:
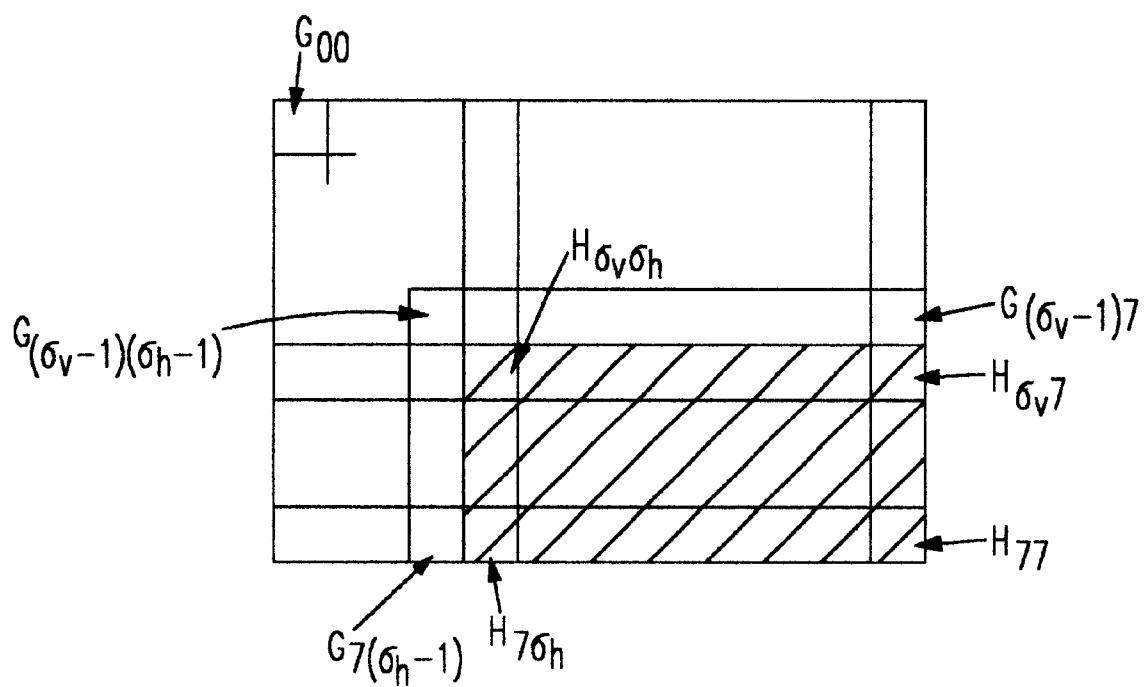
FIG. 14 is a diagram showing a hybrid block generated by comer merging of the two blocks shown in FIG. 11.

Arbitrary corner merges can be obtained by sixteen successive applications of the one-dimensional algorithm, eight on each column and eight on each row, as shown in FIG. 14. To get the hybrid block shown in FIG. 14, the merge algorithm is applied to merge the first $\sigma_h$ rows of block G with the last 8–$\sigma_h$ rows of block H. By identifying the new hybrid block in FIG. 13 with block H and applying the merge algorithm again to merge the first $\sigma_v$ columns of block G with the last 8–$\sigma_v$ columns of block H, the merge shown in FIG. 14 is acquired.

Figure 15:
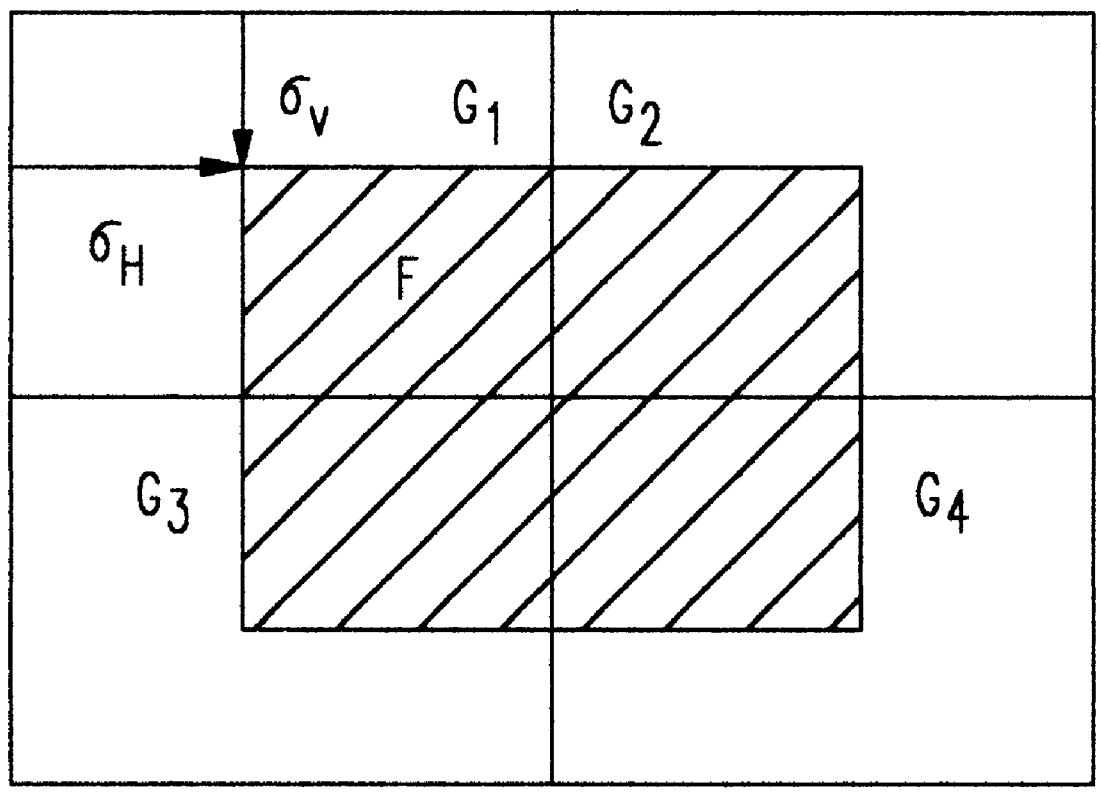
FIG. 15 is a diagram showing a hybrid block generated from four adjacent blocks using the two-dimensional shift algorithm according to the invention.
Figure 16A:
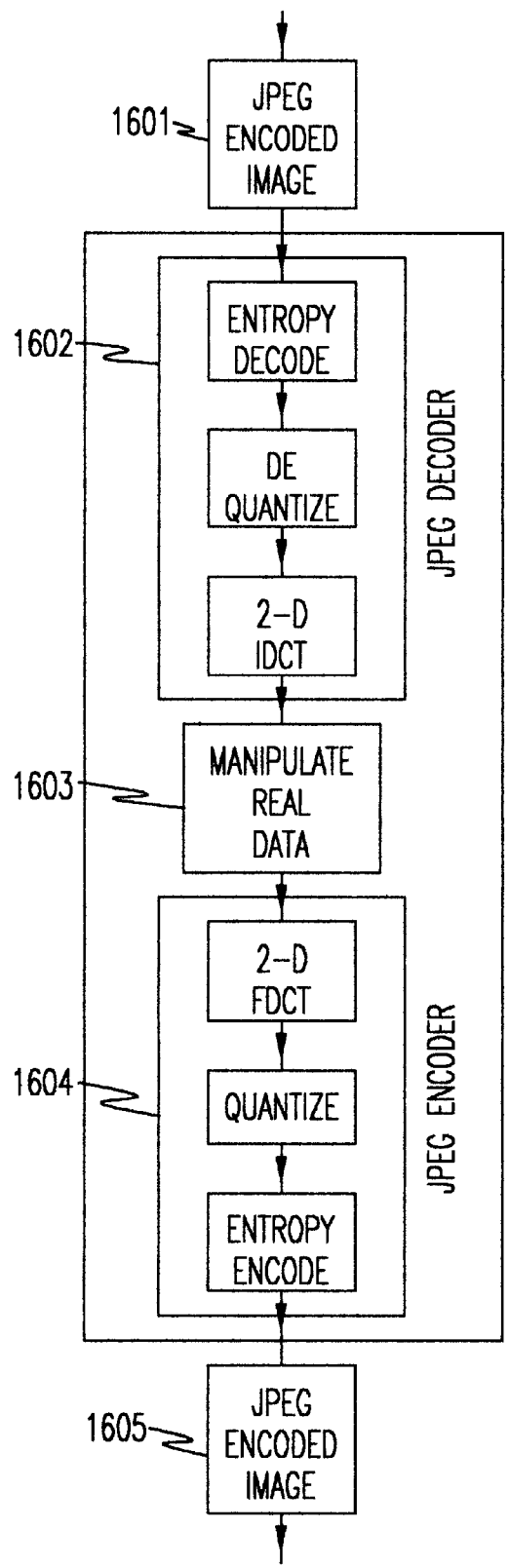
FIGS. 16A, 16B and 16C are flow diagrams which respectively contrast traditional image processing, DCT domain image processing and the "hybrid" processing according to the invention.
Figure 16B:
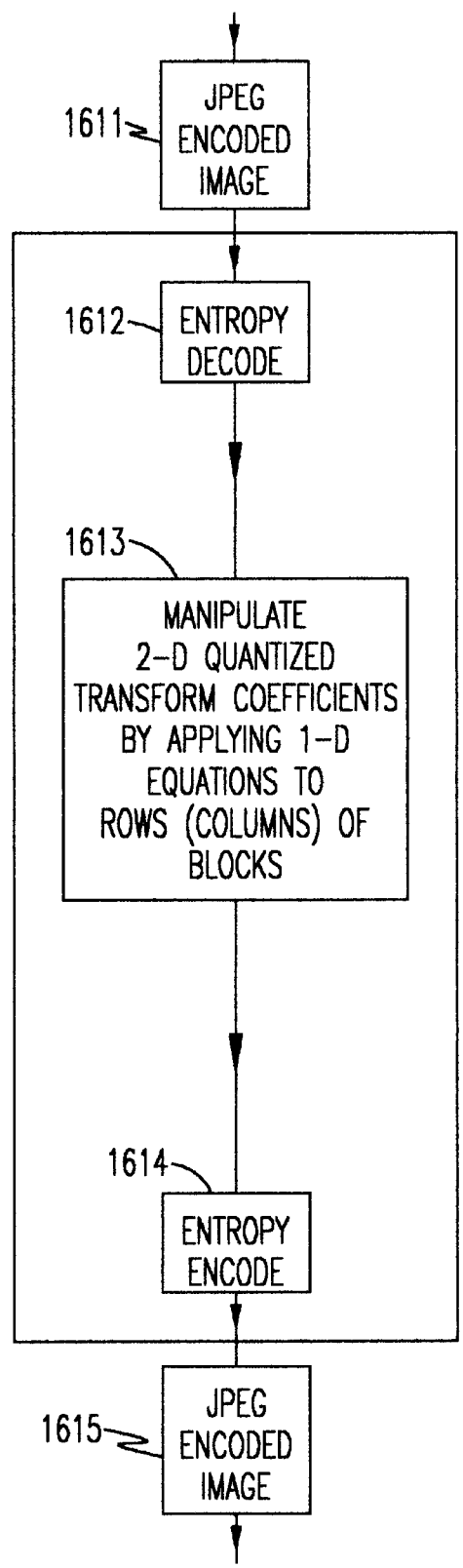
Figure 16C:
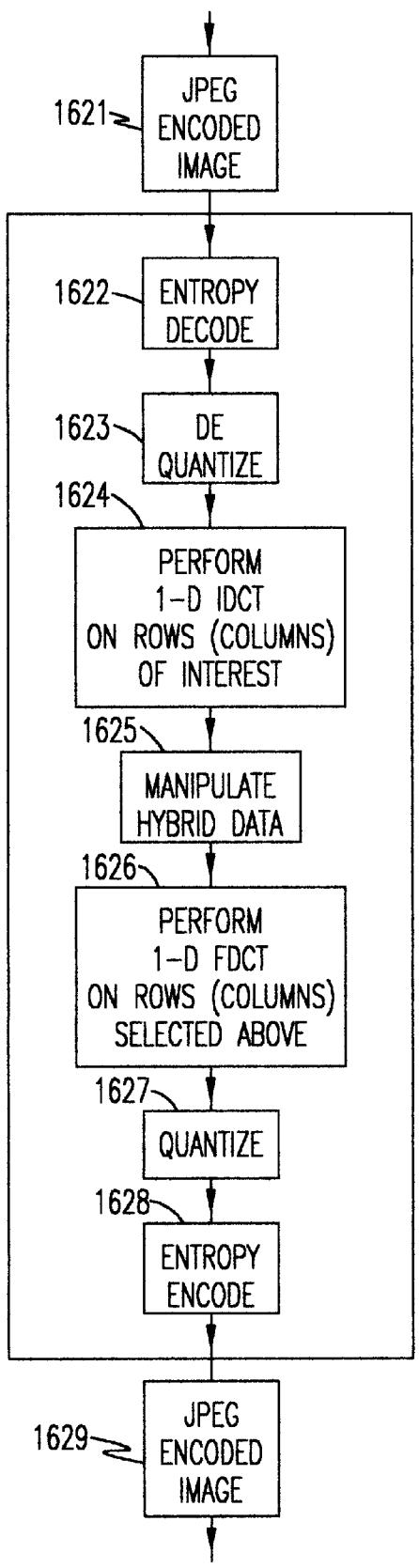

FIG. 15 illustrates the two-dimensional shift algorithm to produce a hybrid 8×8 block F from four adjacent 8×8 blocks $G_1$, $G_2$, $G_3$, and $G_4$. The flow diagrams of FIGS. 16A, 16B and 16C respectively contrast the traditional image processing method, the improved DCT domain image processing method as described in copending patent application Ser. No. 09/524,389, and the "hybrid" domain processing method according to the present invention. Beginning with FIG. 16A showing the traditional image processing method, a JPEG encoded image input at block 1601 is decoded by JPEG decoder 1602. This process includes entropy decoding, dequantizing and a 2D IDCT, as previously described. The real data output is manipulated at block 1603, and this is followed by JPEG encoding in block 1604. The JPEG encoded image is output at block 1605. Turning next to FIG. 16B showing the improved DCT domain image processing method, a JPEG encoded image input at block 1611 is subjected only to entropy decoding by entropy decoder 1612. The 2D quantized transform coefficients are manipulated in block 1613 by applying 1D equations to rows (columns) of the blocks. The manipulated data is then subject to entropy coding by entropy coder 1614, and the JPEG encoded image is output at block 1615. Finally, in FIG. 16C showing the "hybrid" domain image processing according to the present invention, a JPEG encoded image input at block 1621 is subjected to entropy decoding by entropy decoder 1622, and the decoded data is dequantized in block 1623. At this point, 1D IDCT is performed on rows (columns) of interest in block 1624 to produce "hybrid" data. The "hybrid" data is manipulated in block 1625, and then a 1D FDCT is performed on the selected rows (columns). The transformed data is quantized in block 1627 and entropy encoded in block 1628. The JPEG encoded image is output at block 1629. Note that the blocks 1624, 1625 and 1626 can be repeated to effect image transformation in the other dimension; i.e., columns (rows).

Figure 17A:
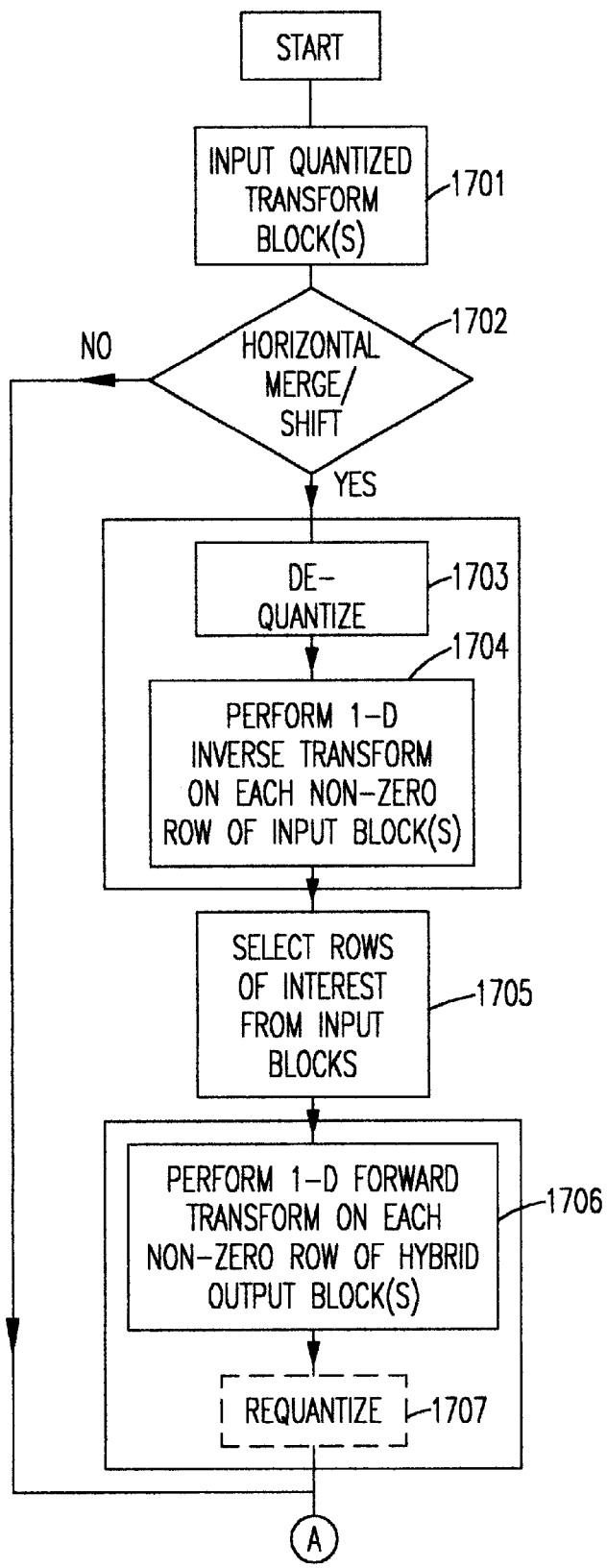
FIGS. 17A and 17B, taken together, are a flow diagram showing the hybrid domain processing implemented by the invention.
Figure 17B:
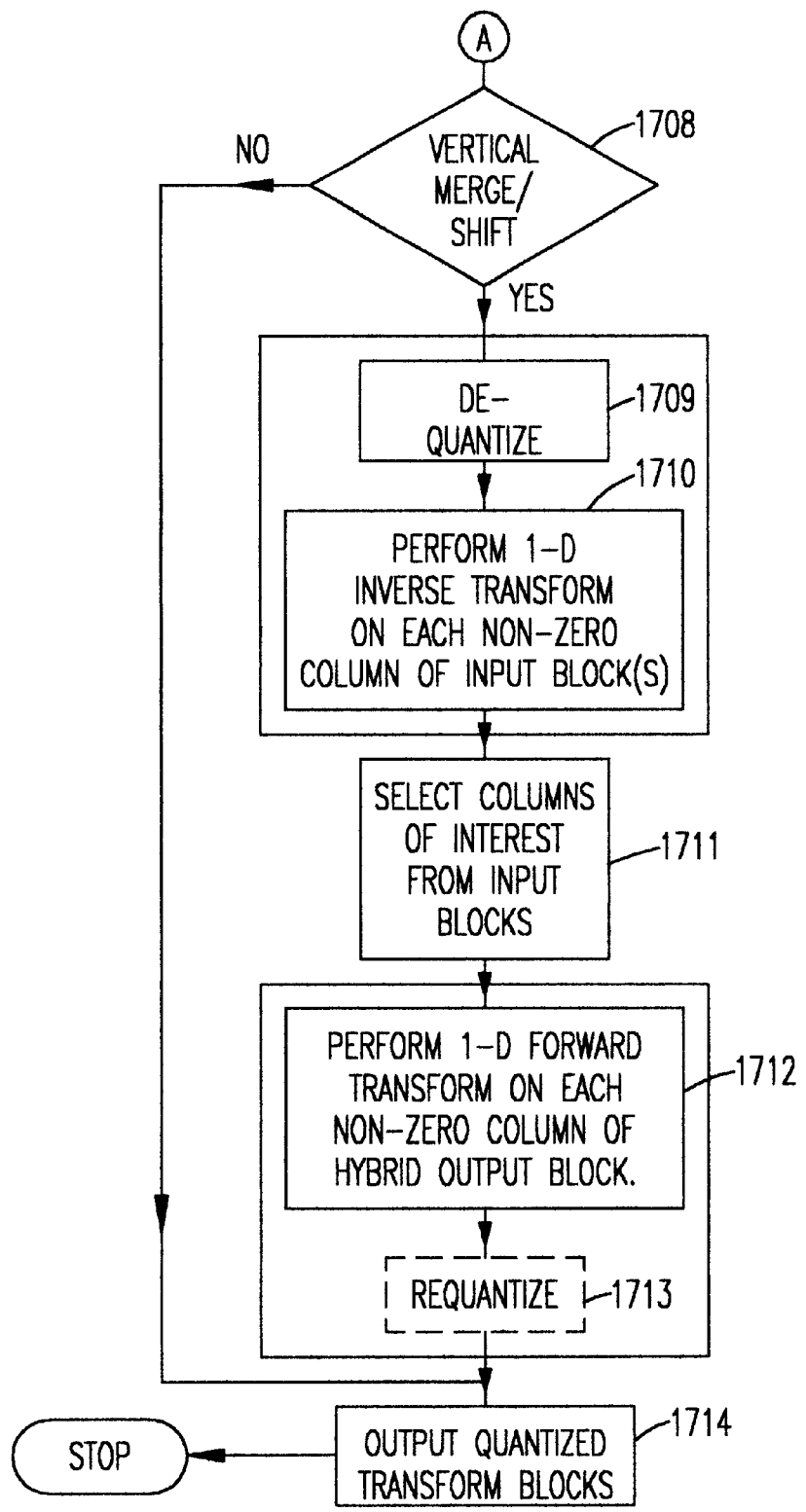

FIGS. 17A and 17B show the flow diagram of the process implemented by the invention. The process begins by inputting quantized transform block(s) in function block 1701. A test is made in decision block 1702 to determine if a horizontal shift/merge is to be performed. If so, the input block(s) are dequantized in function block 1703, and then a one-dimensional inverse transform is performed on each non-zero row of interest of the input block(s) in function block 1704. Rows of interested are selected from the input block(s) in function block 1705. A one-dimensional forward transform is performed on each non-zero row of the hybrid output block(s) in function block 1706, and then the block(s) are requantized in function block 1707.

As shown in FIGS. 18A, 18B and 18C, this last step of requantization can involve any of several possible actions. For example, in FIG. 18A, the block(s) can be requantized leaving the results with extra precision (i.e., non-integer results). This might be done when more processing needs to be done as, for example, when scaling is performed along the other (orthogonal) axis. Alternatively, the requantization can be done with rounding, as shown in FIG. 18B. This would be done when processing is finished. As another alternative, requantization can be done with extra precision but with small coefficients set to zero, as shown in FIG. 18C. Here, for a given coefficient x, "small" means that $|x|<Q_0$ for some predetermined constant $Q_0$. This alternative would be performed when more processing is to be done, but the reduction of small coefficients to zero speeds up this processing.

Returning to FIG. 17A, if the process is not a horizontal shift/merge as determined in decision block 1702 or after the requantization step in function block 1707, the process goes to decision block 1708 where a determination is made as to whether a vertical merge/shift is to be performed. If so, the block(s) are dequantized in function block 1709, and then a one-dimensional inverse transform is performed on each of non-zero column of interest of the input block(s) in function block 1710. Columns of interest are selected from the input block(s) in function block 1711. A one-dimensional forward transform is performed on each non-zero column of the hybrid output block in function block 1712, and then the block(s) are requantized in function block 1713. Again, the requantization step can involve any of several possible actions as shown in FIGS. 18A, 18B and 18C. Finally, the quantized transform blocks are output in function block 1714. In an alternate embodiment, the requantization 1707 and dequantization 1709 can be skipped and the full FDCT precision kept.

Although we have focused our attention on the Discrete Cosine Transform (DCT) since we are interested in processing JPEG (Joint Photographic Experts Group) images, the disclosed algorithm can be easily extended to any other situation where orthogonal linear transformations are applied to a real sample space to merge signals (e.g., the Hadamard-Walsh Transform, used in digital image and speech processing).

Another application example for use of the present invention is in the high-end digital graphics market which uses digital images with sometimes more than 100 megapixels. Glossy advertising brochures and the large photographic trade show booth backdrops are just two examples of the use of such high quality digital imagery. High-quality lossy JPEG compression are sometimes used to keep the transmission and storage costs down. Shifting the block grid, merging multiple images into one image, and/or cropping an image has traditionally required de-compressing and re-compressing which introduce undesirable errors. Our invention avoids these problems by working at higher precision in the hybrid domain.

The above examples for the concepts of the present invention are usual for image and video transform data. The wide use of the Internet has shown the value of JPEG and MPEG compressed image data. When JPEG images are to be printed, then manipulations such as a change of scale or a change of orientation may be required. Use of the present invention overcomes the problem inherent in propagating the errors from the rounding and clipping.

Fan-folded advertising brochures typically are composed of multiple individual pictures. Today's highest end laser printers print more than one page at a time. In such cases, the images generally do not overlap, but may not have the same quantization, positioning relative to the reference grid such as the 8×8 block structure for JPEG DCTs, or orientation. If a single image is required to simplify on-the-fly decoding and printing, then composing the final picture in the transform domain avoids the precision problems inherent in the traditional ways of working in the real domain.

Similar implementations are performed for other industrial, commercial, and military applications of digital processing employing a transform and an inverse transform of data representing a phenomenon when the data is stored in the transform domain. These are thus other representative applications wherein the use of the present invention is highly advantageous.

It is further noted that this invention may also be provided as an apparatus or a computer product. For, example, it may be implemented as an article of manufacture comprising a computer usable medium having computer readable program code means embodied therein for causing a computer to perform the methods of the present invention.

While the invention has been described in terms of preferred embodiments, those skilled in the art will recognize that the invention can be practiced with modification within the spirit and scope of the appended claims.

What we claim as new and desire to secure by Letters Patent is:

1. A computer implemented method for hybrid domain processing of a multi-dimensional transformed image comprising the steps of:
    receiving an n-dimensional orthornormally transformed image representing some original n-dimensional real image;
    performing an m-dimensional inverse transform on the n-dimensional orthornormally transformed image to produce "hybrid" data, where $1 \leq m < n$;
    manipulating the "hybrid" data to effect a desired at most m-dimensional change in the n-dimensional real image;
    applying an m-dimensional forward transform to the manipulated "hybrid" data to return the "hybrid" data to n-dimensional transform space as a processed n-dimensional orthornormally transformed image; and
    outputting the processed n-dimensional orthornormally transformed image to an output device which generates an output n-dimensional real image representation of the process n-dimensional orthornormally transformed image.

2. The computer implemented method for hybrid domain processing of a multi-dimensional transformed image recited in claim 1, further comprising the step of performing an (n−m)-dimensional inverse transform on the manipulated "hybrid" data to produce manipulated n-dimensional real image.

3. The computer implemented method for hybrid domain processing of a multi-dimensional transformed image recited in claim 1, wherein the n-dimensional orthornormally transformed image is a block of two-dimensional Discrete Cosine Transform (DCT) image data.

4. The computer implemented method for hybrid domain processing of a multi-dimensional transformed image recited in claim 3, wherein the two-dimensional DCT image data is entropy decoded from Joint Photographic Experts Group (JPEG) compressed image data.

5. A computer implemented method for hybrid domain processing of a multi-dimensional transformed image comprising the steps of:

receiving an n-dimensional real image;

performing an (n−m)-dimensional forward orthonormal transform on the n-dimensional real image to produce "hybrid" data, where 1—m<n;

manipulating the "hybrid" data to effect a desired at most m-dimensional change in the n-dimensional real image;

applying a m-dimensional forward transform to the manipulated "hybrid" data to generate processed n-dimensional transformed image; and outputting the processed n-dimensional orthornormally transformed image to an output device which generates an output n-dimensional real image representation of the processed n-dimensional orthornormally transformed image.

6. A computer implemented method for hybrid domain processing of a multi-dimensional transformed image comprising the steps of:

receiving first and second input image blocks, $\tilde{G}_1$ and $\tilde{G}_2$, respectively, from a unquantized two-dimensional transformed image; and for each row or column of the image blocks $\tilde{G}_1$ and $\tilde{G}_2$, (1) performing a one-dimensional inverse transform on the $i^{th}$ row or column of the image block $\tilde{G}_1$ to produce "hybrid" data, (2) performing a one-dimensional inverse transform on the $i^{th}$ row or column of the image block $\tilde{G}_2$ to produce "hybrid" data, (3) merging the resulting "hybrid" data to obtain the "hybrid" data of a shifted row or column, (4) computing one-dimensional forward transform data corresponding to the "hybrid" data of step (3) producing a row or column $\tilde{F}_i$ representing a shifted image block, and (5) outputting an image block containing $\tilde{F}_i$ to an output device which generates a real image representation of the image block.

7. A computer implemented method for hybrid domain processing of a multi-dimensional transformed image comprising the steps of:

receiving first and second input image blocks, $\tilde{G}_1$ and $\tilde{G}_2$, respectively, of from a quantized two-dimensional transformed data of a first image;

receiving first and second input image blocks, $\tilde{H}_1$ and $\tilde{H}_2$, respectively, of from a quantized two-dimensional transformed data from a second image; and for each row or column of the image blocks $\tilde{G}_1$ and $\tilde{G}_2$ and the image blocks $\tilde{H}_1$ and $\tilde{H}_2$, (1) dequantizing the $i^{th}$ row or column of the image blocks $\tilde{G}_1$ and $\tilde{G}_2$ and the $i^{th}$ row or column of the image blocks $\tilde{H}_1$ and $\tilde{H}_2$, (2) performing a one-dimensional inverse transform on the $i^{th}$ row or column of the image blocks $\tilde{G}_1$ and $\tilde{G}_2$ and the image blocks $\tilde{H}_1$ and $\tilde{H}_2$ to produce "hybrid" data corresponding to the dequantized $i^{th}$ row or column of image blocks $\tilde{G}_1$ and $\tilde{G}_2$ and image blocks $\tilde{H}_1$ and $\tilde{H}_2$, (3) merging or shifting the resulting "hybrid" data to obtain "hybrid" data of the merged or shifted row or column, (4) computing one-dimensional forward transform data corresponding to the "hybrid" data of step (3) producing a row or column $\tilde{F}_i$ representing a merged or shifted image, and (5) outputting an image block containing $\tilde{F}_i$ to an output device which generates a real image representation of the block.

8. A computer implemented method for hybrid domains processing of a multi-dimensional transformed image comprising the steps of:

receiving first and second two-dimensional (2D) input $N_1 \times N_2$ transform image blocks to be modified by a shift or merge operation, where $N_1$ and $N_2$ are dimensions of the first and second image blocks along first and second axes, respectively;

applying a one-dimensional (1D) inverse transform to the first and second 2D input transform image blocks to be modified along the first axis, leaving each of the first and second image blocks as first and second transform blocks in a "hybrid" domain;

selecting m elements of the first transform block along said first axis and $N_1$—m elements of the second transform block along said first axis, where $m<N_1$;

using the m elements of the first transform block and $N_1$—m elements of the second transform block in a one-dimensional forward transform along said first axis to generate a merged 2D form block; and outputting the merged 2D transform block to an output device which generates a 2D real image representation of the merged 2D transform block.

9. The computer implemented method for hybrid domain processing of a multi-dimensional transformed image recited in claim 8, wherein the transformed images are entropy decoded from JPEG (Joint Photographic Experts Group) compressed images.

10. The computer implemented method for hybrid domain processing of a multi-dimensional transformed image recited in claim 8, wherein the transformed images are entropy decoded MPEG (Moving Pictures Experts Group) compressed images.

11. A computer implemented method for hybrid domain processing of a multi-dimensional transformed image comprising the steps of:

receiving first and second input blocks of transform coefficients for two $N_1 \times N_2$ image blocks G and H;

performing a one-dimensional inverse transform on $n_1$ rows of image block G and $N_1-n_1$ rows of image block H to produce $N_1$ rows of "hybrid" data, where $n_1<N_1$ and is a vertical merge/shift parameter;

merging/shifting the image blocks G and H into a temporary $N_1 \times N_2$ block K by combining the $n_1$ "hybrid" rows with the $N_1-n$ "hybrid" rows and performing a one-dimensional forward transformation on resulting $N_1$ "hybrid" rows;

performing a one-dimensional inverse transform on $N_2-n_2$ columns of block K and on image block G to produce $N_2$ columns of "hybrid" data, where $n_2<N_2$ and is a horizontal merge/shift parameter;

merging/shifting the block K and image block G by combining the $n_2$ "hybrid" columns with the $N_2-n_2$ "hybrid" columns and performing a one-dimensional forward transformation on the resulting $N_2$ "hybrid" columns; and outputting the merged/shifted block K and image block G to an output device which generates a real image representation of the merged/shifted block K and image block G.

12. A computer implemented method for hybrid domain processing of a multi-dimensional transformed image comprising the steps of:

receiving first and second input blocks of quantized transform coefficients for two $N_1 \times N_2$ image blocks G and H;

performing a dequantization and inverse transform on $n_1$ rows of image block G and $N_1-n_1$ rows of image block H to produce $N_1$ rows of "hybrid" data, where $n_1<N_1$ and is a vertical merge/shift parameter;

merging/shifting the image blocks G and H into a temporary $N_1 \times N_2$ block K by combining the $n_1$ "hybrid" rows with the $N_1-n_1$ "hybrid" rows and performing a requantization with extra precision and a one-dimensional forward transformation on the resulting $N_1$ "hybrid" rows;

performing a dequantization and a one-dimensional inverse transform on $N_2-n_2$ columns of block K and on $n_2$ columns of image block G to produce $N_2$ columns $N_2$ columns of "hybrid" data, where $n_2<N_2$ and is a horizontal merge/shift parameter;

merging/shifting the block K and image block G by combining the $n_2$ "hybrid" columns with the $N_2-n_2$ "hybrid" columns and performing requantization of a one-dimensional forward transformation on the resulting $N_2$ "hybrid" columns; and outputting the merged/shifted block K and image block G to an output device which generates a real image representation of the merged/shifted block K and image block G.

13. The computer implemented method for hybrid domain processing of a multi-dimensional transformed image recited in claim 12, wherein the extra precision comprises the step of setting sufficiently small results to zero.

14. A computer implemented method for hybrid domain processing of a multi-dimensional transformed image comprising the steps of:

receiving first and second input blocks of transform coefficients for two $N_1 \times N_2$ image blocks G and H;

performing a one-dimensional inverse transform on $n_2$ columns of the image block G and on $N_2-n_2$ columns of the image block H to produce $N_2$ columns of "hybrid" data, where $n_2<N_2$ and is a horizontal merge/shift parameter;

merging/shifting the image blocks G and H into a temporary $N_1 \times N_2$ block K by combining the $n_2$ "hybrid" columns with the $N_2-n_2$ "hybrid" columns and performing a one-dimensional forward transformation on resulting $N_2$ "hybrid" columns;

performing a one-dimensional inverse transform on $N_1-n_1$ rows of block K and on $n_1$ rows of image block G to produce $N_1$ rows of "hybrid" data, where $n_1<N_1$ and is a vertical merge/shift parameter;

merging/shifting the block K and the image block G by combining the $n_1$ "hybrid" rows with the $N_1-n_1$ "hybrid rows" and performing a one-dimensional forward transformation on resulting $N_1$ "hybrid" rows; and outputting the merged/shifted block K and image block G to an output device which generates a real image representation of the merged/shifted block K and image block G.

15. A computer implemented method for hybrid domain processing of a multi-dimensional transformed image comprising the steps of:

receiving first and second input blocks of quantized transform coefficients for two $N_1 \times N_2$ image blocks G and H;

performing a dequantization and inverse transform on $n_2$ columns of the image block G and $N_2-n_2$ columns of the image block H to produce $N_2$ columns of "hybrid" data, where $n_2>N_2$ and is a horizontal merge/shift parameter;

merging/shifting the image blocks G and H into a temporary $N_1 \times N_2$ block K by combining the $n_2$ "hybrid" rows with the $N_2-n_2$ "hybrid" columns and performing a requantization with extra precision and a one-dimensional forward transformation on resulting $N_2$ "hybrid" columns;

performing a dequantization and a one-dimensional inverse transform on $N_1-n_1$ rows of block K and on $n_1$ rows of the image block G to produce $N_1$ columns of "hybrid" data, where $n_1<N_1$ and is a vertical merge/shift parameter;

merging/shifting the block K and the image block G by combining the $n_1$ "hybrid" rows with the $N_1-n_1$ "hybrid" columns and performing requantization and a one-dimensional forward transformation on resulting $N_1$ "hybrid" rows; and outputting the merged/shifted block K and image block G to an output device which generates a real image representation of the merged/shifted block K and image block G.

16. The computer implemented method for hybrid domain processing of a multi-dimensional transformed image recited in claim 15, wherein the extra precision comprises the step of setting sufficiently small results to zero.

\* \* \* \* \*